(12) United States Patent
Frazer et al.

(10) Patent No.: US 6,999,471 B1
(45) Date of Patent: Feb. 14, 2006

(54) COMMUNICATION STRUCTURE FOR MULTIPLEXED LINKS

(75) Inventors: Mark J. Frazer, Toronto (CA); Frank M van Heeswyk, Toronto (CA); Frank Kschischang, Toronto (CA); Ramesh Mantha, Toronto (CA); W. Martin Snelgrove, Toronto (CA)

(73) Assignee: SOMA Networks, Inc., San Francisco, CA (US)

(*) Notice: Subject to any disclaimer, the term of this patent is extended or adjusted under 35 U.S.C. 154(b) by 635 days.

(21) Appl. No.: 09/722,525

(22) Filed: Nov. 28, 2000

(51) Int. Cl.
*H04J 3/16* (2006.01)
(52) U.S. Cl. .................. 370/468; 370/348; 370/229
(58) Field of Classification Search ............. 370/335, 370/337, 347, 352, 468, 229
See application file for complete search history.

(56) References Cited

U.S. PATENT DOCUMENTS

| | | | |
|---|---|---|---|
| 5,568,483 A | 10/1996 | Padovani et al. | 370/84 |
| 5,673,259 A * | 9/1997 | Quick, Jr. | 370/342 |
| 5,790,534 A * | 8/1998 | Kokko et al. | 370/335 |
| 5,878,277 A * | 3/1999 | Ohta | 710/37 |
| 5,930,230 A | 7/1999 | Odenwalder et al. | 370/208 |
| 5,949,814 A | 9/1999 | Odenwalder et al. | 375/200 |
| 6,031,832 A * | 2/2000 | Turina | 370/348 |
| 6,347,091 B1 * | 2/2002 | Wallentin et al. | 370/437 |
| 6,434,130 B1 * | 8/2002 | Soininen et al. | 370/331 |
| 6,469,994 B1 * | 10/2002 | Ueda | 370/329 |
| 6,519,461 B1 * | 2/2003 | Andersson et al. | 455/453 |
| 6,614,810 B1 * | 9/2003 | Lee et al. | 370/471 |

FOREIGN PATENT DOCUMENTS

| | | |
|---|---|---|
| EP | 0 831 669 A2 | 3/1998 |
| EP | 1309216 A2 * | 5/2003 |
| WO | WO 92/22162 | 12/1992 |
| WO | WO 98/19481 | 5/1998 |
| WO | WO 9912282 A1 * | 3/1999 |
| WO | WO 99/23844 | 5/1999 |
| WO | WO 99/52307 | 10/1999 |

OTHER PUBLICATIONS

Parsa, K. "Common Packet Channel (CPCH): The Optimum Wireless Internet Mechanism in W-CDMA". First International Conference on 3G Mobile Communications Technologies. Mar. 27-29, 2000. pp. 148-155.*

(Continued)

*Primary Examiner*—John Pezzlo
*Assistant Examiner*—Donald L Mills
(74) *Attorney, Agent, or Firm*—Katten Muchin Rosenman LLP

(57) ABSTRACT

A communication structure and method which allows connection-like and connectionless communications to be provided on a multiplexed link is provided. The structure and method can make efficient use of available transmission capacity and/or network resources while providing both types of communication and hybrids. Connection-like communications can be provided by a channel having allocated transmission capacity dedicated to the communication while connectionless communication can be provided by a shared channel through which data can be transmitted to subscribers. In an embodiment, the shared channel transmits frames of packets addressed to one or more of the subscribers. The allocation of transmission capacity between the dedicated channels and the shared channel can be fixed, or can be managed to meet network or network operator requirements. The structure and method can also be managed by the network operator to permit prioritization of some communications over others. In another embodiment, two or more shared channels are provided.

20 Claims, 5 Drawing Sheets

OTHER PUBLICATIONS

Shigeaki Ogose, et al., "Microcellular Personal Multimedia Communications System with Connectionless Communication Capability", IEEE, 1997, pp. 1972-1976 (XP-000738708).

"CDMA/HDR: A Bandwidth Efficient High Speed Wireless Data Service for Nomadic Users", Paul Bender, et al., Aug. 25, 1999.

* cited by examiner

COMMUNICATION STRUCTURE FOR MULTIPLEXED LINKS

FIELD OF THE INVENTION

The present invention relates to a communication structure and method. More specifically, the present invention relates to a communication structure and method for transmitting data, which can include both voice data and non-voice, "pure" data, over a multiplexed link.

BACKGROUND OF THE INVENTION

Many communications systems are known. Early communications systems were connection-based, in that a connection was physically established through the system between the communicating nodes. For example, in the early versions of the public switched telephone network (PSTN), users were provided a point-to-point connection to other users through switchboards, switches and trunks. More recently, the PSTN has employed multiplexed lines that are shared, through at least some part of the network, by multiple users, but which still provide a fixed amount of bandwidth and network capacity to each user for their voice data connection, these bandwidth and network capacities being selected as meeting the anticipated maximum requirements for a common telephone voice conversation, typically referred to as toll quality.

Data communications systems for "pure data" (i.e.—data transmissions other than voice) have also been built which are connectionless. Connectionless systems generally operate on a best effort and/or statistical basis to deliver data via a suitable, but not necessarily fixed, route between the users, at best effort transmission rates and/or error rates. An example of a connectionless system is a packet network such as the Internet wherein the network capacity is shared amongst the users.

More recently, attempts have been made to combine connectionless and connection-like services in a single communication system. For example, much interest has been expressed recently in Voice over IP (VoIP) through the Internet. However, it has proven difficult and/or costly to create a communication system which can meet both the connection-like requirements of VoIP (voice data requiring a moderate data rate and having some tolerance for errors, but requiring low latency) and connectionless requirements of pure data (often utilizing a high, bursty data rate and having a relatively high tolerance to latency but little tolerance for errors).

Attempts have been made to provide a connection-like mechanism via the Internet. One such attempt is the ReSerVation (RSVP) Protocol proposed by some vendors and which allows network capacity to be "reserved" at routers and switches to establish a "virtual" connection through the Internet to better ensure that desired quality of service (QoS) levels will be met for the virtual connection. However, support for RSVP must explicitly be implemented within an application and at each switch and/or router involved in the virtual connection, which has been difficult to achieve to date. Further, there is a significant amount of time and overhead required to set up an RSVP connection which can negate the benefits of an RSVP connection for connections of relatively short duration. Even when implemented, RSVP does not typically result in an efficient usage of network capacity as the maximum anticipated bandwidth and/or network capacity requirements must be reserved for the duration of the connection, even if they are not used, or are not used continuously. Thus, in many circumstances, reserved network resources are sitting idle, or are under utilized, for some portion of time. Further, RSVP does not include any incentive mechanism by which applications/users are encouraged to only make effective use of network resources, i.e.—unreasonable requests for resources can be made by a user or application as there are generally no economic or other disincentives for doing so.

Such difficulties are exacerbated when the links on which the network, or a portion of the network, is implemented involve a multiplexed link of expensive and/or limited bandwidth. In such cases efficient utilization of bandwidth and/or network resources is very important and RSVP or similar strategies have difficulty in meeting desired efficiencies. As used herein, the term multiplex and/or multiplexed link are intended to comprise any system or method by which a link is shared amongst users. Examples of such multiplexed links include wired or wireless links employing multiplexing systems such as TDMA, CDMA, OFDM, FDMA or other arrangements.

A specific prior art example of a communication system providing digital voice transmission over a multiplexed wireless link is a PCS (Personal Communication System) cellular system. Such systems can employ a multiplexing technique such as CDMA, TDMA, hybrid systems such as GSM, or other strategies to allow multiple callers to share the wireless link between the cellular base station and the PCS mobile units in both the upstream (mobile to base station) and downlink (base station to mobile) directions. One popular such system is the CDMA-based IS-95 cellular system in use in North America, South Korea and Japan.

While IS-95 based systems, or the like, have been very successful at handling voice communications, attempts to provide pure data services over such systems have experienced less success. To date, one approach has been that an assignable channel, from a limited set of such channels, must be dedicated to each user to which pure data is to be sent. This does not generally make efficient use of the available IS-95 bandwidth, as data rates and requirements vary much more widely than does a typical voice communication for which the channels were designed.

Other attempts have been made to offer data communication systems which address these problems and which are backward compatible with IS-95, but to date no system has been created which provides effective usage of available, limited, bandwidth on a multiplexed link for data transmissions including voice data and pure data.

It is therefore desired to have a communication structure and method of providing communications, including both voice data and pure data, over wireless or other multiplexed links.

SUMMARY OF THE INVENTION

It is an object of the present invention to provide a novel communication structure and method which obviates or mitigates at least some of the above-identified disadvantages of the prior art.

According to a first aspect of the present invention, there is provided a communications structure for communicating between at least one network node and at least two subscriber stations through a multiplexed link, said structure comprising:

a plurality of dedicated channels, each dedicated channel having allocated to it a portion of the transmission capacity of said link to provide communication between said network node and one of said at least two subscriber stations; and a shared channel having allocated to it a portion of the transmission capacity of said link and wherein said shared channel is operable to transmit frames of data packets from said network node to said at least two subscriber stations.

According to another aspect of the present invention, there is provided a method of transmitting data from a network node to a plurality of subscriber stations over a multiplexed link, comprising the steps of:

(i) determining the requirements for a first data transmission intended for a subscriber station;

(ii) selecting the use of a dedicated channel or a shared channel to effect said first data transmission in accordance with said determined requirements; and (iii) if a dedicated channel is selected, obtaining a dedicated channel when available and transmitting said first data transmission thereon and if a shared channel is selected, transmitting said first data transmission on said shared channel in the form of data packets addressed to said subscriber station.

According to another aspect of the present invention, there is provided a method of managing a transmission structure for transmitting data from a network node to a plurality of subscriber stations over a multiplexed link, comprising the steps of:

(i) allocating a portion of the bandwidth of said multiplexed link to create a number of dedicated channels, each of which can be assigned to a different one of said subscriber stations;

(ii) allocating a portion of the remaining bandwidth of said multiplexed link to a shared channel which can communicate with a plurality of said subscriber stations;

(iii) monitoring the requirements for dedicated channels in said structure and reallocating bandwidth of said multiplexed link between said shared channel and said dedicated channels to create or remove dedicated channels as required.

The present invention provides a communication structure and method to allow connection-like and connectionless communications to be provided on a multiplexed communication link. The structure and method can make efficient use of available bandwidth and/or network resources while providing both types of communication. Connection-like communications can be provided by a dedicated channel having allocated bandwidth dedicated to the communication while connectionless communication can be provided by a shared channel through which data can be transmitted to users. In an embodiment, the shared channel transmits frames of packets addressed to the users. The allocation of bandwidth between the dedicated channels and the shared channel can be fixed, or can be managed to meet network or network operator requirements. The structure and method can also be managed by the network operator to permit prioritization of some communications over others.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
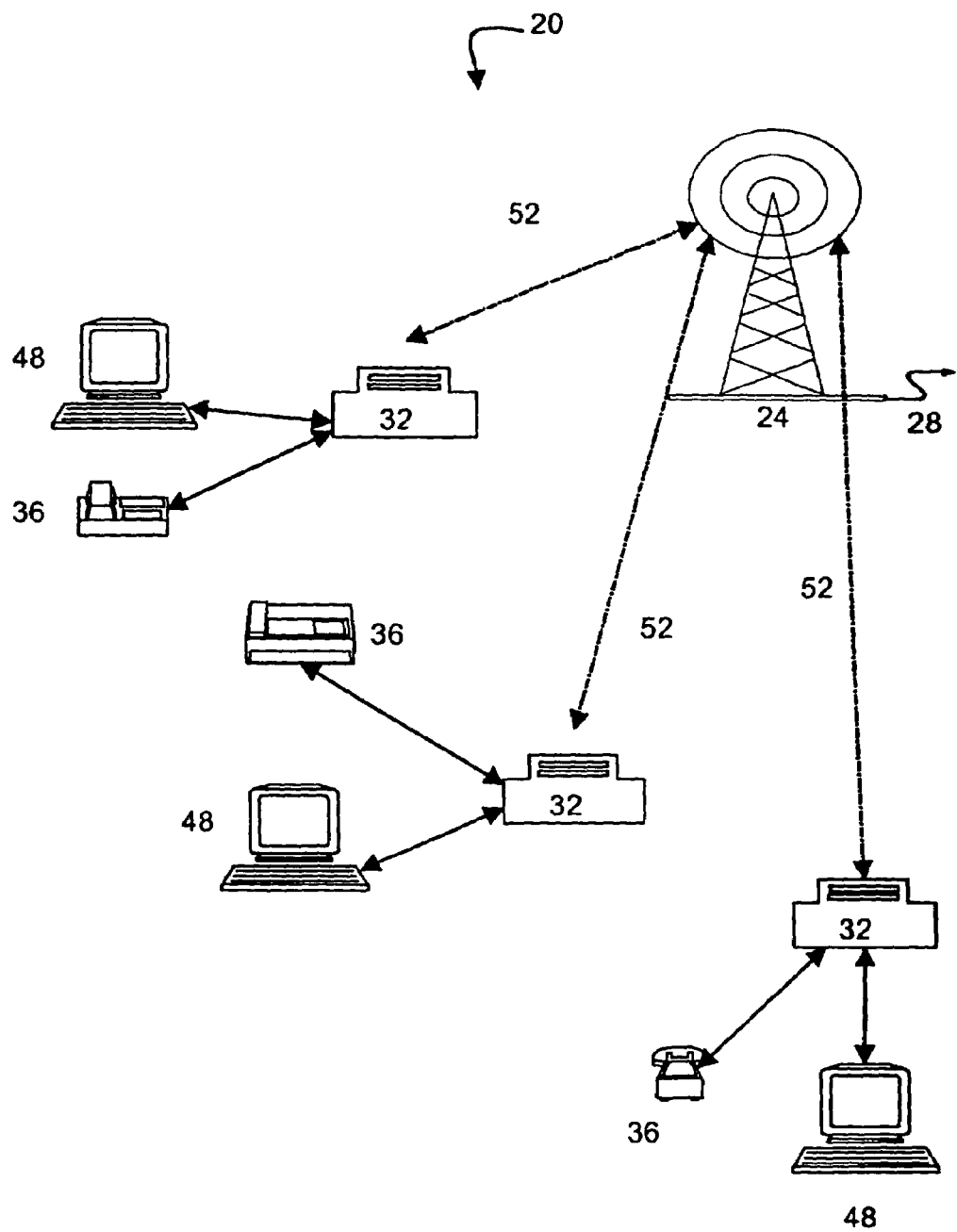
FIG. 1 shows a wireless local loop system employing a multiplexed radio link.

FIG. 1 shows a wireless local loop (WLL) system, indicated generally at 20. System 20 includes at least one network node, such as base station 24, which is connected to one or more networks, such as the PSTN and/or the Internet, and/or to one or more other base stations 24, via a back haul 28. Backhaul 28 can be any suitable communication link such as a T1, T3, E1, E3, OC3, radio or microwave link. Each base station 24 communicates with a plurality of subscriber stations 32 via a multiplexed radio link 52 shared between subscriber stations 32. In FIG. 1, each subscriber station 32 can provide simultaneous connections to at least one telephony device 36, such as a telephone set or facsimile machine, and a data device 48 such as a computer, video conferencing system, etc.

Radio link 52 employs a suitable multiplexing technique, such as TDMA, FDMA, OFDM, CDMA, hybrids thereof or other multiplexing techniques to allow simultaneous use of radio link 52 by base station 24 and more than one subscriber station 32. These multiplexing techniques can be used to "channelize" and/or otherwise share a radio link.

In prior art systems where, for example, subscriber stations are mobile telephones, a base station can assign the usage of a portion of a radio link to a subscriber station, on an as-needed basis. For example, in a system employing IS-95, the radio link is channelized into a sixty-four channels in the downlink from the base station to the subscriber station. Some of these channels are dedicated for control and signaling purposes between the base station and subscriber stations, and the balance form a pool of traffic channels, one or more of which can be assigned as needed, to communicate with a subscriber station.

The IS-95 communication system suffers from certain disadvantages. For example, the channels are of fixed preselected data rate (e.g. –9.6 or 14.4 kilobits per second, although different amounts of repetition can be employed, resulting in different effective rates) and use of a traffic channel is reserved for the duration of the connection, even if the connection is not presently using the link resources (bandwidth and/or code space, etc.) allocated to the channel. It is not unusual that a voice conversation includes relatively long pauses wherein no information is transmitted and channel bandwidth is essentially wasted (although in CDMA, this results in a desirable reduction in interference between users).

When connectionless services are considered, this problem is much worse as transmissions of pure data to a data device, such as a computer, can comprise one or only a few packets that typically arrive in bursts, rather than at a steady rate. A channel established for such a connectionless service will therefore typically not use a large part of its allocated link resources, yet these unused resources are reserved for the duration of that connection and are unavailable for use elsewhere in the system until the channel is freed. In addition, there is a relatively significant overhead required to assign a channel between a base station and a subscriber station. Thus, for connectionless services between a base station and a subscriber station, the time and/or network processing requirements for establishing a channel can be unreasonable for short bursts of packets.

Figure 2:
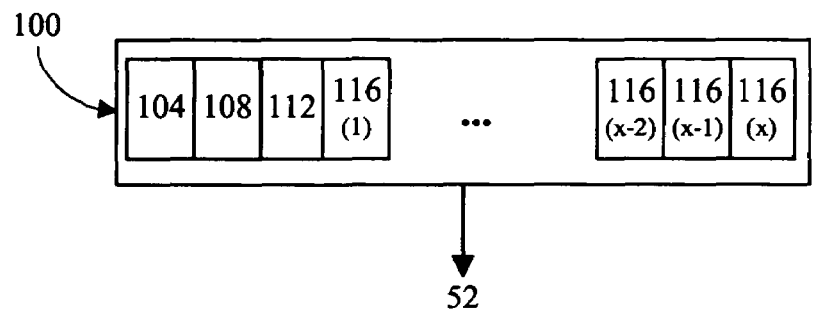
FIG. 2 shows a prior art communication system.

FIG. 2 shows a prior art downlink (from base station to users) structure 100 for the radio-link used in IS-95 CDMA systems. Structure 100 represents the bandwidth available which typically is arranged into as many as sixty-four channels. Channels 104, 108 and 112 are control channels used to establish and maintain communications with users. For example, channel 104 can be the IS-95 pilot channel, channel 108 the IS-95 paging channel and channel 112 the IS-95 synchronization channel. Additional, different or fewer control channels can be employed that, for example, are transmitted to all (typically mobile) users. Channels $116_{(1)}$ through $116_{(x)}$ are the 'x' traffic channels which carry user (non-control) data between base station and the users. In IS-95A, traffic channels 116 all have the same data rate, while in IS-95B, the data rate of channels 104 through $116_{(x)}$ can be varied, resulting in different total numbers of channels. It is important to note that structure 100 is essentially part of a connection-based system, in that a traffic channel 116, and its associated resources, are allocated to a user for the duration of a communication and provide a fixed amount of bandwidth, and/or data rate, for the duration of the connection.

Figure 3:
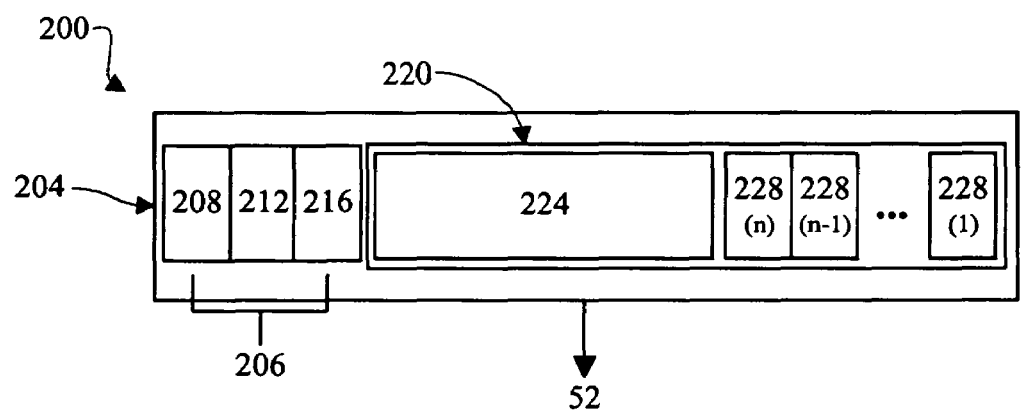
FIG. 3 shows a communication structure in accordance with an embodiment of the present invention.

FIG. 3 shows a structure 200 in accordance with an embodiment of the present invention which can be used, for example, as a downlink radio structure with WLL system 20 in FIG. 1. In structure 200, some portion 206 of the total available bandwidth 204 is allocated to one or more control channels (such as 208, 212 and 216) and the remaining portion 220 of bandwidth 204 is allocated between a shared channel 224 and 'n' dedicated channels, $228_{(1)}$ through $228_{(n)}$. As used herein, the term "bandwidth" is intended to comprise the transmission capacity of a link. Depending upon the multiplexing technique employed on a link and the physical layer of the link, transmission capacity can be allocated to users as frequency bands, spreading code space, time slots or other link resources as will be apparent to those of skill in the art and the term bandwidth is intended to comprise all of these, as appropriate.

As described in more detail below, the bandwidth allocated to shared channel 224 can be increased and the number 'n' of dedicated channels 228 correspondingly decreased, or vice versa, as required.

Shared channel 224 is a multiplexed channel in that several, or all, subscriber stations 32 in FIG. 1 are capable of receiving data transmitted on it from base station 24 and shared channel 224 typically implements connectionless data transmissions to subscriber stations 32. One or more packets of data to be transmitted to a subscriber station 32 from base station 24 are assembled into a transmission frame, often along with packets addressed to other subscriber stations 32. These frames can be assembled at base station 24 from packets received via back haul 28 and/or from packets received at base station 24 from other subscriber stations 32 or can be assembled elsewhere and forwarded to base station 24 via backhaul 28. Each assembled frame is transmitted from base station 24 via shared channel 224, over radio link 52, to subscriber stations 32 and each subscriber station 32 receives the transmitted frame and examines the packets therein to identify those, if any, which are addressed to it. Packets addressed to a subscriber station 32 are then processed accordingly by the addressed subscriber station 32.

In a present embodiment of the invention, a transmission frame is ten milliseconds in length and it is intended that the construction and transmission of frames is performed on an on going basis, with a frame being constructed and readied for transmission while the preceding frame is being transmitted.

It is intended that each subscriber station 32 will continuously listen for and receive shared channel 224 and thus the time and/or network overhead processing requirements which would otherwise be required to establish a connection to a subscriber station 32 is avoided after a subscriber station 32 is in a normal operating mode (achieved as part of the normal power-up of each subscriber station 32). In this manner, even small amounts of data (such as single packets) can be transferred from base station 24 to subscriber stations 32 in an efficient manner as no setup is specifically required for transmission of a packet to a subscriber station 32 and no reservation of bandwidth is required.

For connection-like services, such as voice communication or other services which have QoS requirements such as relatively low latency or other communications requiring known transmission characteristics, a dedicated channel 228 can be established, as needed, between base station 24 and a subscriber station 32. Dedicated channels 228 can be similar to the traffic channels of IS-95 and have a fixed data rate, or they can be allocated to provide different data rates as desired to, for example, enable voice communication at different qualities, e.g.—toll level quality (at 16 kilobits per second (kbps)) versus CD-Audio level quality (at 128 kbps). In any case, dedicated channels 228 effectively reserve bandwidth to provide connection-like service levels for a connection between base station 24 and a subscriber station 32.

It is also contemplated that hybrid connections can be established which employ both shared channel 224 and one or more dedicated channels 228. For example, a connection which has a relatively fixed 'normal' data rate and requires low latency, but which also experiences infrequent bursts to a higher data rate, can be assigned a dedicated channel 228 sufficient for transmitting at the 'normal' data rate and any bursts can be transmitted by shared channel 224.

Alternatively, shared channel 224 can be used to implement both connection-like and connectionless services. In any event, the present invention is not limited to dedicated channels 228 providing connection-like services or shared channels 224 providing connection-less services and many suitable strategies for advantageously employing the structure of the present invention will occur to those of skill in the art.

Figure 4A:
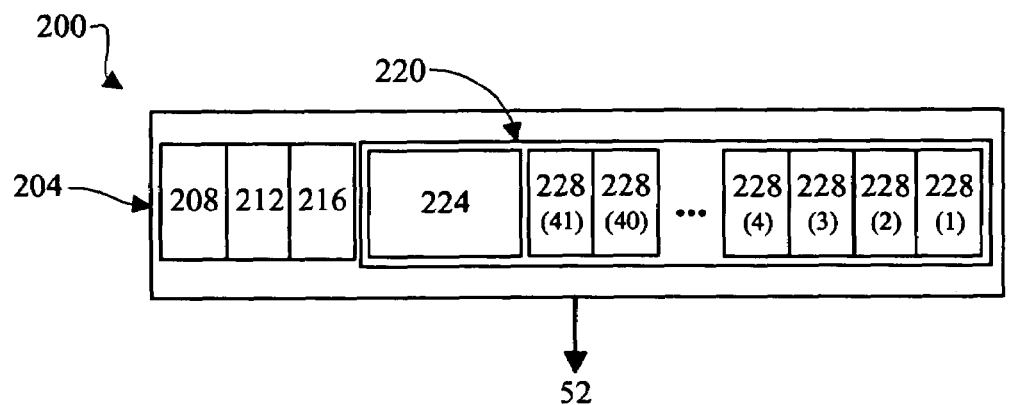
FIGS. 4a and 4b show the structure of FIG. 3 wherein the numbers of dedicated channels are changed to vary the allocation of bandwidth between a shared channel and dedicated channels.
Figure 4B:
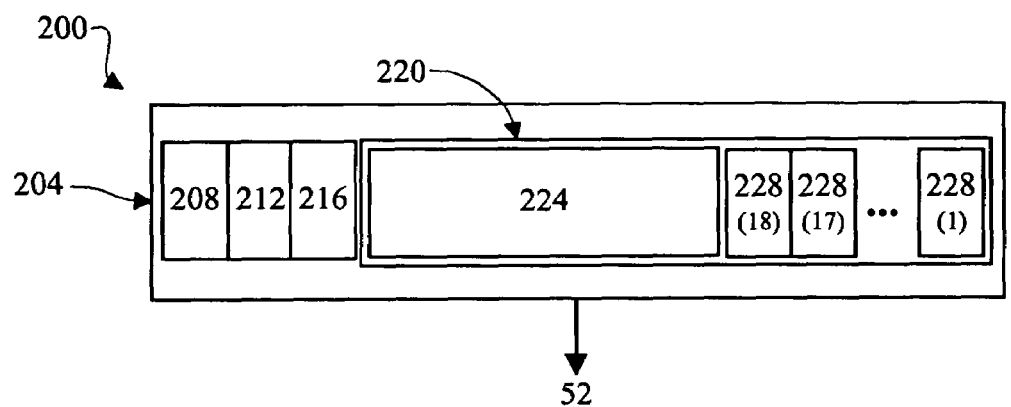

As mentioned above, bandwidth portion 220 is managed to allocate bandwidth between shared channel 224 and dedicated channels 228. For example, in FIG. 4a bandwidth portion 220, which could be enough bandwidth for fifty-four IS-95A traffic channels (fifty-four times ninety-six hundred kbps equals five-hundred and eighteen-point-four kbps), has been allocated to create forty-one dedicated channels 228 of ninety-six-hundred kbps (three-hundred and ninety-threepoint-six kbps in total) and to allocate the balance of bandwidth portion 220 (one-hundred and twenty-four-point-eight kbps), to shared channel 224. In FIG. 4b, only eighteen dedicated channels 228 have been allocated (eighteen times ninety-six-hundred kbps equals one-hundred and seventy-two-point-eight kbps) and the balance (three-hundred and forty-five-point-six kbps) has been allocated to shared channel 224.

While structure 200 can be configured with a fixed amount of bandwidth allocated to shared channel 224 and remaining bandwidth allocated to a fixed number of dedicated channels 228, it is contemplated that bandwidth portion 220 will be actively managed in many circumstances. By actively managing the allocation of bandwidth portion 220 between shared channel 224 and dedicated channels 228, the operator of structure 200 can meet goals appropriate to the needs of their users and/or make efficient use of the bandwidth available to them. For example, an operator can decide to prioritize providing dedicated channels 228 for voice communications over providing higher data rates on shared channel 224.

It is contemplated that in actively managing bandwidth portion 220, a minimum bandwidth allocation will be selected for shared channel 224, for example bandwidth equivalent to a data rate of fifty kbps. This minimum allocation can be selected by an operator according to the service commitments shared channel 224 must meet and the number of subscriber stations 32 that channel 224 must serve. Shared channel 224 is then always allocated at least this selected minimum amount of bandwidth.

It is further contemplated that bandwidth for a selected minimum number of dedicated channels 228 will also always be allocated. The remainder of bandwidth portion 220 will then be allocated to shared channel 224. If the network operator has prioritized the provisioning of dedicated channels 228, then when some portion of this remainder of bandwidth is subsequently required to create additional dedicated channels 228, the required bandwidth is de-allocated from shared channel 224 and allocated to the new dedicated channel(s) 228, provided that shared channel 224 is still allocated at least the selected minimum amount of bandwidth. Otherwise, the capacity of structure 200 would be exceeded and the creation of further dedicated channels 228 is inhibited.

To reduce set up time and overheads, in addition to the selected minimum number of dedicated channels 228, it is contemplated that a pool of a selected number of dedicated channels 228 (a "channel pool") will be allocated in anticipation of future needs. The dedicated channels 228 in the channel pool are allocated bandwidth but are not initially assigned to any subscriber station 32. When a new dedicated channel 228 is required by a subscriber station 32, it is assigned one of the dedicated channels 228 in the channel pool, thus avoiding the delay and/or overheads resulting from the reallocation of bandwidth from shared channel 224 to create a new dedicated channel 228.

Assuming additional bandwidth can be reallocated from shared channel 224, then a replacement dedicated channel 228 will be created and placed in the channel pool at an appropriate time. If bandwidth cannot be reallocated from shared channel 224, (because, for example, it is at the selected minimum bandwidth), then the channel pool is decreased in the number of channels until an occupied dedicated channel 228 can be freed-up and returned to the channel pool.

When the channel pool contains the selected number of dedicated channels 228, then bandwidth allocated to additional dedicated channels that are no longer required for subscriber use can be reallocated to shared channel 224. It is also contemplated that channel pool can be managed such that both a minimum and maximum number of channels can be specified for the pool, i.e.—the size of the pool can be as small as five channels, before replacement channels are added to the pool and as many as eight channels can be in the pool before bandwidth is reallocated to shared channel 224.

It is contemplated that a wide variety of other management strategies and/or refinements to the strategies mentioned above will occur to those of skill in the art. For example, no channel pool need be established if the overhead delay required to create a dedicated channel 228 can be tolerated.

Figure 5A:
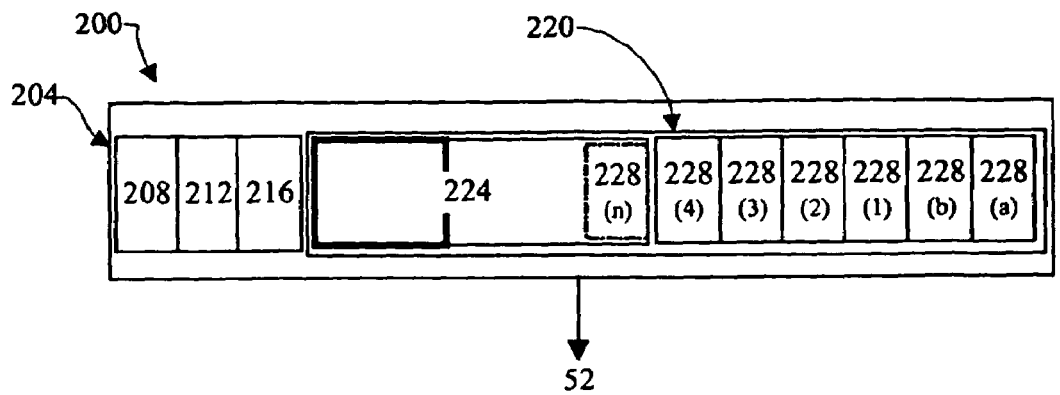
FIG. 5a shows an example of the structure of FIG. 3 wherein a minimum bandwidth allocation has been defined for the shared channel.

FIG. 5a shows a configuration of structure 200 wherein shared channel 224 has a defined minimum size (indicated in heavy solid line) but has been allocated additional bandwidth (as indicated in thin solid line). Further, in this configuration structure 200 has a channel pool of two dedicated channels $228_{(a)}$ and $228_{(b)}$ and four dedicated channels $228_{(1)}$ through $228_{(4)}$ assigned to subscriber stations 32. As shown, when another channel $228_{(n)}$ is to be created, it will be allocated bandwidth from shared channel 224, which is resized accordingly.

Figure 5B:
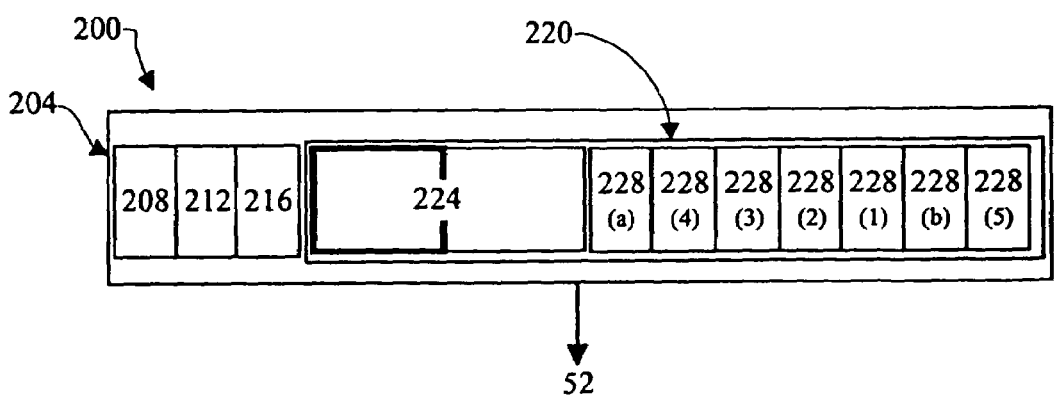
FIG. 5b shows the structure of FIG. 5a when an additional dedicated channel has been created and the bandwidth of the shared channel has been decreased accordingly.

As shown in FIG. 5b, when another dedicated channel 228 is required to be assigned to a subscriber, in addition to channels $228_{(1)}$ through $228_{(4)}$, channel $228_{(a)}$ (in this example) will be assigned as the required channel as channel $228_{(5)}$, a replacement dedicated channel $228_{(a)}$ will be created and placed in the channel pool to replace the assigned channel and the bandwidth allocated to shared channel 224 will be correspondingly decreased.

Figure 5C:
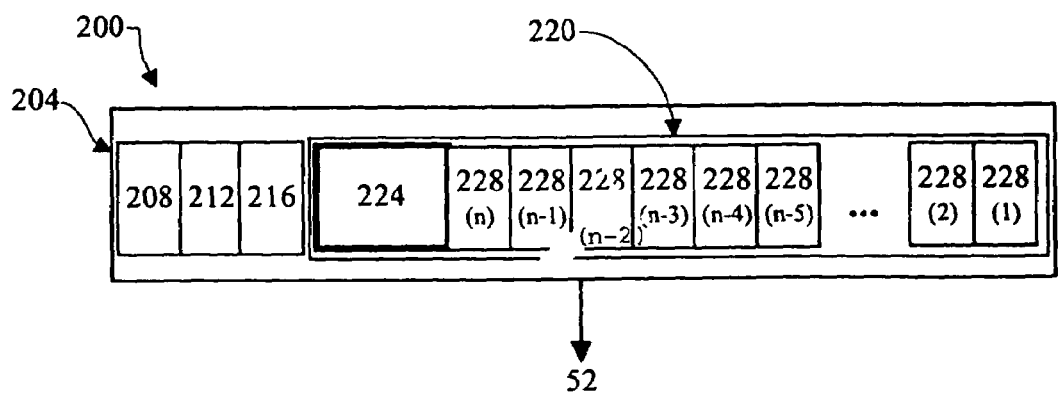
FIG. 5c shows the structure of FIG. 5a when the shared channel is reduced to its selected minimum level and the remainder of the bandwidth of the system has been allocated to assigned dedicated channels.

As the capacity of structure 200 is approached, and shared channel 224 is reduced to its defined minimum bandwidth, unused dedicated channels $228_{(a)}$ and $228_{(b)}$ (as channels $228_{(n)}$ and $228_{(n-1)}$ in the Figure) will be assigned to subscribers, as required, and no new dedicated channels 228 will be created, allowing the channel pool to become empty, as shown in FIG. 5c.

Figure 6:
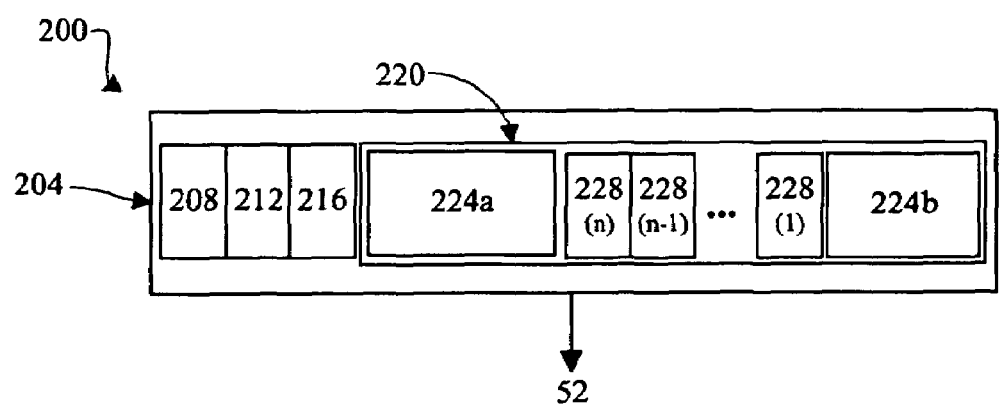
FIG. 6 shows the structure of FIG. 3 wherein two shared channels are provided.

It is also contemplated that more than one shared channel 224 can be provided, if desired, in bandwidth portion 220. In such a case, as shown in FIG. 6, each shared channel 224a and 224b will result in corresponding decreases in bandwidth available to dedicated channels 228 or other shared channels 224. As shown, shared channels 224a and 224b can have different amounts of bandwidth allocated to them. The allocation of bandwidth to shared channels 224 and dedicated channels 228 can be fixed, or can be managed. For example, either or both of shared channels 224a and 224b can have their allocated bandwidths increased, or decreased, accordingly as the number of dedicated channels 228 increases or decreases and/or as the bandwidth allocated to the other shared channel 224 is increased or decreased.

One reason for providing more than one shared channel 224 can include the ability to reduce transmission latency by reducing the length of the transmission frames and/or allowing multiple frames to be sent at the same time. Another reason to employ more than one shared channel 224 is to provide an upgrade path whereby "old" subscriber stations 32 that cannot cope with an increased data rate or some other new development can listen to one shared channel 224a which employs a suitable data rate or other needed technology and "new" subscriber stations 32 can listen to another shared channel 224b which employs an increased data rate or other new technology.

Another possible reason for including more than one shared channel 224 is to permit a security scheme for some subscribers. A group of subscriber stations 32 which are to receive secured communications will listen to an encrypted shared channel 224a, while the balance of subscriber stations 32 listen to a non-encrypted shared channel 224b. While packets on the non-encrypted shared channel 224b can have encrypted payloads, the entire frames of packets on the encrypted shared channel 224a can be encrypted, inhibiting traffic analysis to be performed on communications sent via channel 224a.

Yet another reason for providing more than one shared channel 224a can be that different subscriber stations 32 can have different abilities to receive the signals. Thus, one shared channel 224 can have modulation, encoding and/or transmission power levels suitable for a group of subscriber stations 32 which have good reception characteristics and a second shared channel 224b can employ a different modulation, encoding or power level suitable for another group of subscriber stations 32 which have poorer reception characteristics.

The present invention is not limited to radio links or to other links employing CDMA as a multiplexing technique. For example, the present invention can be employed for certain links operating on wired network or optical network physical layers and employing multiplexing techniques such as OFDM, TDMA, FDMA or hybrid multiplexing techniques.

The present invention provides a communication system and method which allows connection-like and connectionless communications to be provided in a manner which can make efficient use of available bandwidth and/or network resources. The system and method can be managed by the operator of a network to permit prioritization of some communications over others and/or to vary bandwidth allocated between connection-like and connectionless communications as needed and/or desired.

The above-described embodiments of the invention are intended to be examples of the present invention and alterations and modifications may be effected thereto, by those of skill in the art, without departing from the scope of the invention which is defined solely by the claims appended hereto.

We claim:

1. A communications structure for communicating between a network node and at least two subscriber stations through a multiplexed link, said structure comprising:
   a plurality of dedicated channels, each dedicated channel having allocated to it a portion of the transmission capacity of said link to provide communication between said network node and one of said at least two subscriber stations; and
   a shared downlink channel having allocated to it a portion of the transmission capacity of said link and wherein said shared downlink channel is operable to transmit frames of packets from said network node to said at least two subscriber stations, at least some such frames including packets of data addressed to different ones of said at least two subscriber stations wherein said structure includes at least a preselected minimum number of said dedicated channels and said portion of the transmission capacity of said link allocated to said shared downlink channel comprises the balance of said transmission capacity that is not occupied by said dedicated channels.

2. The structure according to claim 1 wherein said portion of the transmission capacity of said link allocated to said shared downlink channel is fixed.

3. The structure according to claim 1 including at least two shared downlink channels, each shared downlink channel being operable to transmit frames of packets from said network node to said at least two subscriber stations.

4. The structure according to claim 3 wherein each of said at least two shared downlink channels is operable to transmit said frames of packets to different ones of said at least two subscriber stations.

5. The structure of claim 3 wherein said balance of said transmission capacity is allocated unequally to each of said at least two shared downlink channels.

6. The structure according to claim 1 wherein additional dedicated channels are created, as needed, by reallocating necessary transmission capacity of said link from at least one shared downlink channel to such additional dedicated channels.

7. The structure according to claim 6 wherein said at least one shared downlink channel has a preselected minimum transmission capacity and reallocation of transmission capacity from said at least one shared downlink channel to said additional dedicated channels ceases before said transmission capacity allocated to said shared downlink channels falls below said minimum transmission capacity.

8. The structure according to claim 1 wherein data for a subscriber station is transmitted from said network node via a combination of a dedicated channel and said shared downlink channel, said dedicated channel providing a first data transmission rate and said shared downlink channel providing an additional transmission rate, as needed, to accommodate transmission bursts in excess of said first data transmission rate.

9. The structure of claim 1 wherein at least one of said plurality of dedicated channels has a different amount of said transmission capacity allocated to it than does another of said plurality of dedicated channels.

10. The structure of claim 1 wherein said link is a radio link.

11. The structure of claim 10 wherein said radio link employs CDMA as a multiplexing technique.

12. A method of transmitting data from a network node to a plurality of subscriber stations over a multiplexed link, comprising the steps of:
   (i) determining the requirements for a first data transmission intended for a subscriber station;
   (ii) selecting the use of a dedicated channel or a shared downlink channel to effect said first data transmission in accordance with said determined requirements; wherein said selected channel is selected from at least a preselected minimum number of dedicated channels each allocated a portion of the transmission capacity of said link and said shared downlink channel, and the portion of the transmission capacity of said link allocated to said shared downlink channel comprises the balance of said transmission capacity that is not occupied by said dedicated channels; and and
   (iii) if a dedicated channel is selected, obtaining a dedicated channel when available and transmitting said first data transmission thereon and if a shared downlink channel is selected, transmitting said first data transmission on said shared downlink channel in the form of data packets addressed to said subscriber station, said data packets assembled into frames, at least some such frames including packets of data addressed to different ones of said subscriber stations.

13. The method of claim 12 wherein the determination in step (i) is made in consideration of the QoS requirements of said first data transmission.

14. The method of claim 12 wherein the determination in step (i) is made in consideration of the type of data to be transmitted.

15. The method of claim 12 wherein, if a dedicated channel is selected and no such dedicated channel is available, said first data transmission is transmitted on said shared downlink channel.

16. The method of claim 12 where in step (ii), both a dedicated channel and a shared downlink channel are selected, an amount of said first data transmission corresponding to the transmission capacity of said dedicated channel being sent thereon and the balance of said first data transmission being sent on said shared downlink channel.

17. A method of managing a transmission structure for transmitting data from a network node to a plurality of subscriber stations over a multiplexed link, comprising the steps of:
   (i) allocating a portion of the bandwidth of said multiplexed link to create a number of dedicated channels, each of which can be assigned to a different one of said subscriber stations;
   (ii) allocating a portion of the remaining bandwidth of said multiplexed link to a shared downlink channel which can communicate with a plurality of said subscriber stations, data transmission on said shared downlink channel in the form of data packets assembled into frames, at least some such frames including packets of data addressed to different ones of said subscriber stations;
   (iii) monitoring the requirements for dedicated channels in said structure and reallocating bandwidth of said multiplexed link between said shared downlink channel and said dedicated channels to create or remove dedicated channels as required.

18. The method of claim 17 wherein said structure includes a preselected minimum number of dedicated channels and, in step (iii), no dedicated channels are removed when said number of dedicated channels is equal to said preselected minimum number.

19. The method of claim 17 wherein said structure includes a preselected minimum portion of bandwidth allocated to said shared downlink channel and, in step (iii), no dedicated channels are created which would otherwise reduce the bandwidth allocated to said shared downlink channel below said minimum portion of bandwidth.

20. The method of claim 17 wherein said structure includes a preselected minimum number of dedicated channels and a preselected minimum portion of bandwidth allocated to said shared downlink channel and, in step (iii), no dedicated channels are created which would otherwise reduce the bandwidth allocated to said shared downlink channel below said minimum portion of bandwidth and no dedicated channels are removed when said number of dedicated channels is equal to said preselected minimum number.

* * * * *